United States Patent
Green

(10) Patent No.: US 11,920,708 B2
(45) Date of Patent: Mar. 5, 2024

(54) SEALING INTERFACE TO ADJUST RADIAL AND ANGULAR OFFSET

(71) Applicant: Lam Research Corporation, Fremont, CA (US)

(72) Inventor: Tyler Green, Fremont, CA (US)

(73) Assignee: Lam Research Corporation, Fremont, CA (US)

( * ) Notice: Subject to any disclaimer, the term of this patent is extended or adjusted under 35 U.S.C. 154(b) by 68 days.

(21) Appl. No.: 17/623,868

(22) PCT Filed: Jun. 30, 2020

(86) PCT No.: PCT/US2020/040351
§ 371 (c)(1),
(2) Date: Dec. 29, 2021

(87) PCT Pub. No.: WO2021/007076
PCT Pub. Date: Jan. 14, 2021

(65) Prior Publication Data
US 2022/0412490 A1    Dec. 29, 2022

Related U.S. Application Data

(60) Provisional application No. 62/873,056, filed on Jul. 11, 2019.

(51) Int. Cl.
*F16L 27/06* (2006.01)
*F16L 27/10* (2006.01)

(52) U.S. Cl.
CPC ............ *F16L 27/06* (2013.01); *F16L 27/1012* (2013.01)

(58) Field of Classification Search
CPC ......... F16L 27/06; F16L 27/073; F16L 27/04; F16L 27/053; F16L 27/047; F16L 27/1012; F16L 23/02; F16L 23/18
See application file for complete search history.

(56) References Cited

U.S. PATENT DOCUMENTS 3,212,798 A * 10/1965 Lewis ................... F16L 27/04
3,425,718 A *  2/1969 Shaw, Jr. ............... F16L 23/02
(Continued)

FOREIGN PATENT DOCUMENTS

| KR | 200357231 Y1 * | 7/2004 |
| KR | 200410394 Y1 * | 3/2006 |
| KR | 10-2016-0115638 A | 10/2016 |

OTHER PUBLICATIONS

KR200357231Y1—Machine Translation—English (Year: 2004).*
(Continued)

*Primary Examiner* — William S. Choi
(74) *Attorney, Agent, or Firm* — PENILLA IP, APC

(57) ABSTRACT

A sealing interface includes a first tube having an end with a convex surface and a second tube having an end with a convex surface. A spacer is disposed between the respective ends of the first and second tubes. One side of the spacer has a concave surface that substantially matches the convex surface of the end of the first tube, and another side of the spacer has a concave surface that substantially matches the convex surface of the end of the second tube. The spacer includes a through hole in fluid communication with a fluid passageway of the first tube and a fluid passageway of the second tube. Tying elements are respectively coupled to the first tube and the second tube, with the tying elements applying a compressive force between the first tube and the spacer, and applying a compressive force between the second tube and the spacer.

21 Claims, 12 Drawing Sheets

(56) References Cited

U.S. PATENT DOCUMENTS

| | | | | |
|---|---|---|---|---|
| 3,993,332 | A * | 11/1976 | Borodin | F16L 27/04 |
| 4,133,558 | A * | 1/1979 | Ahlstone | F16L 27/073 |
| 4,381,871 | A * | 5/1983 | Dopyera | F16L 27/053 |
| 5,505,464 | A * | 4/1996 | McGarvey | |
| 5,806,833 | A * | 9/1998 | Riibe | F16L 27/053 |
| 5,845,386 | A * | 12/1998 | Watts | |
| 6,419,279 | B1 * | 7/2002 | Latham | F16L 27/053 |
| 8,820,794 | B1 | 9/2014 | Betz et al. | |
| 2007/0194570 | A1 * | 8/2007 | Crouse | |
| 2009/0314374 | A1 | 12/2009 | Ono | |
| 2015/0316186 | A1 | 11/2015 | Norris | |
| 2015/0369413 | A1 | 12/2015 | Dill et al. | |

OTHER PUBLICATIONS

KR200410394Y1—Machine Translation—English (Year: 2006).*
PCT Notification of Transmittal of the International Search Report and the Written Opinion of the International Searching Authority, issued in corresponding International Patent Application No. PCT/US2020/040351, dated Oct. 15, 2020 (15 total pages).

* cited by examiner (View A-A)

SEALING INTERFACE TO ADJUST RADIAL AND ANGULAR OFFSET

CLAIM OF PRIORITY

This application is a national stage filing of and claims priority, under 35 U.S.C. § 371, to International Application No. PCT/US2020/040351, filed on Jun. 30, 2020 and entitled "SEALING INTERFACE TO ADJUST RADIAL AND ANGULAR OFFSET," which claims the benefit of and priority, under 35 U.S.C. § 119(e), to U.S. Provisional Patent Application No. 62/873,056, filed on Jul. 11, 2019 and entitled "SEALING INTERFACE TO ADJUST RADIAL AND ANGULAR OFFSET," the disclosures of both of which are incorporated by reference herein in their entirety.

BACKGROUND

In machines, tolerance stack-up can make it difficult to assemble components. By way of example, in a semiconductor processing tool, tubes may be used to transport gas from a manifold to a valve and from the valve into a processing chamber. Tolerance stack-up can result in a relatively large offset, in some cases up to a quarter of an inch, between ends of tubes to be joined or between the end of a tube and a connected component, e.g., a component connected to a manifold for fluid distribution, to which the end of the tube is to be joined. Such a relatively large offset between components to be joined can make the installation process both difficult and time consuming.

It is in this context that embodiments arise.

SUMMARY

In an example embodiment, a sealing interface includes a first tube having an end with a convex surface and a second tube having an end with a convex surface. A spacer is disposed between the respective ends of the first tube and the second tube, with the spacer including a first side, a second side, and a third side that extends from the first side to the second side. The third side of the spacer has an outer surface that defines an outer periphery of the spacer. The first side of the spacer has a concave surface that substantially matches the convex surface of the end of the first tube, and the second side of the spacer has a concave surface that substantially matches the convex surface of the end of the second tube. The spacer includes a through hole that extends from the first side to the second side, with the through hole being in fluid communication with a fluid passageway of the first tube and a fluid passageway of the second tube. A plurality of tying elements is respectively coupled to the first tube and the second tube, with the plurality of tying elements applying a compressive force between the first tube and the spacer, and the plurality of tying elements applying a compressive force between the second tube and the spacer.

In one embodiment, the end of the first tube has an annular channel defined therein, and a sealing member is disposed in the annular channel defined in the end of the first tube so that a portion of the sealing member is in the annular channel and a portion of the sealing member is in contact with the first side of the spacer. In one embodiment, the sealing member disposed in the annular channel defined in the end of the first tube is an O-ring.

In one embodiment, the end of the second tube has an annular channel defined therein, and a sealing member is disposed in the annular channel defined in the end of the second tube so that a portion of the sealing member is in the annular channel and a portion of the sealing member is in contact with the second side of the spacer. In one embodiment, each of the sealing members disposed in the annular channels defined in the respective ends of the first and second tubes is an O-ring.

In one embodiment, the end of the first tube has a flange extending therefrom and the end of the second tube has a flange extending therefrom, and each of the flanges extending from the respective ends of the first and second tubes has a plurality of holes defined therein. In one embodiment, the plurality of tying elements is respectively coupled to the plurality of holes in the flange of the first tube and the plurality of holes in the flange of the second tube. In one embodiment, the plurality of tying elements includes springs, or wires, or bolts, or a combination of springs, and/or wires, and/or bolts.

In one embodiment, the flange extending from the end of the first tube is integrally formed with the first tube or the flange extending from the end of the second tube is integrally formed with the second tube. In one embodiment, the flange extending from the end of the first tube is defined by a separate element mounted on the first tube or the flange extending from the end of the second tube is defined by a separate element mounted on the second tube. In one embodiment, the separate element mounted on the first tube or the second tube is a washer.

In one embodiment, a plurality of projections is provided proximate to respective ends of the first and second tubes, with the plurality of projections being spaced around respective outer surfaces of the first and second tubes. In one embodiment, the plurality of projections includes posts that extend from respective outer surfaces of the first and second tubes for a distance sufficient to clear an outer periphery of each of the respective ends of the first and second tubes, and the plurality of tying elements is respectively coupled to outer ends of the posts of the first tube and outer ends of the posts of the second tube. In one embodiment, the plurality of projections includes tabs that extend from respective outer surfaces of the first and second tubes for a distance sufficient to clear an outer periphery of each of the respective ends of the first and second tubes, each of the tabs has a hole defined therein proximate to an outer end thereof, and the plurality of tying elements is respectively coupled to the plurality of holes in the tabs of the first tube and the plurality of holes in the tabs of the second tube.

In another example embodiment, a sealing interface includes a connected component having a first end, a second end, and an internal passageway extending from the first end to the second end. The first end is configured to be connected to a fluid source so that a fluid from the fluid source is guided away from the source through the internal passageway of the connected component. The second end includes a convex surface and a flange, with the flange having a plurality of holes defined therein. The sealing interface also includes a tube having an end with a convex surface and a flange, with the flange having a plurality of holes defined therein. A spacer is disposed between the second end of the connected component and the end of the tube, with the spacer including a first side, a second side, and a third side that extends from the first side to the second side. The third side of the spacer has an outer surface that defines an outer periphery of the spacer. The first side of the spacer has a concave surface that substantially matches the convex surface of the second end of the connected component, and the second side of the spacer has a concave surface that substantially matches the convex surface of the end of the tube. The spacer includes a through hole that extends from the first side to the second side, with the through hole being in fluid communication with the internal passageway of the connected component and a fluid passageway of the tube. A plurality of tying elements is respectively coupled to the plurality of holes in the flange of the connected component and the plurality of holes in the flange of the tube, with the plurality of tying elements applying a compressive force between the connected component and the spacer, and the plurality of tying elements applying a compressive force between the tube and the spacer.

In one embodiment, the second end of the connected component has an annular channel defined therein, and a sealing member is disposed in the annular channel defined in the second end of the connected component so that a portion of the sealing member is in the annular channel and a portion of the sealing member is in contact with the first side of the spacer. In one embodiment, the sealing member disposed in the annular channel defined in the second end of the connected component is an O-ring.

In one embodiment, the end of the tube has an annular channel defined therein, and a sealing member is disposed in the annular channel defined in the end of the tube so that a portion of the sealing member is in the annular channel and a portion of the sealing member is in contact with the second side of the spacer. In one embodiment, each of the sealing members disposed in the annular channels defined in the respective ends of the connected component and the tube is an O-ring.

In one embodiment, the plurality of tying elements includes springs. In one embodiment, the plurality of tying elements includes wires or bolts. In one embodiment, the plurality of tying elements includes a combination of springs, and/or wires, and/or bolts.

In one embodiment, the flange of the connected component has four holes defined therein, with the four holes being substantially evenly spaced around an outer periphery of the flange of the connected component. The flange of the tube has four holes defined therein, with the four holes being substantially evenly spaced around an outer periphery of the flange of the tube. The four tying elements are respectively coupled to the four holes defined in the flange of the connected component and the four holes in the flange of the tube. In one embodiment, the four tying elements are springs. In another embodiment, the four tying elements are wires or bolts. In yet another embodiment, the four tying elements are a combination of springs, and/or wires, and/or bolts.

In one embodiment, the flange of the connected component has at least five holes defined therein, with the at least five holes being spaced around an outer periphery of the flange of the connected component. The flange of the tube has at least five holes defined therein, with the at least five holes being spaced around an outer periphery of the flange of the tube. At least five tying elements are respectively coupled to the at least five holes defined in the flange of the connected component and the at least five holes in the flange of the tube. In one embodiment, a first number of the at least five tying elements is respectively coupled to holes defined in one side of the flange of the connected component and holes defined in one side of the flange of the tube, and a second number of the at least five tying elements is respectively coupled to holes defined in another side of the flange of the connected component and holes defined in another side of the flange of the tube. The first number of the at least five tying elements is greater than the second number of the at least five tying elements.

In one embodiment, the at least five tying elements include springs. In one embodiment, the at least five tying elements include springs, or wires, or bolts, or a combination of springs, and/or wires, and/or bolts.

In yet another example embodiment, a sealing interface includes a first tube having an end. A spacer has a first side, a second side, and a third side that extends from the first side to the second side. The third side of the spacer has an outer surface that defines an outer periphery of the spacer. The first side of the spacer is attached to the end of the first tube, and the second side of the spacer has a concave surface. The spacer includes a through hole that extends from the first side to the second side, with the through hole being in fluid communication with a fluid passageway of the first tube. A second tube has an end with a convex surface that substantially matches the concave surface of the second side of the spacer, with the end of the second tube being disposed in an opposing relationship with the second side of the spacer so that the through hole of the spacer is in fluid communication with a fluid passageway of the second tube. A plurality of tying elements is respectively coupled to the first tube and the second tube or respectively coupled to the spacer and the second tube, with the plurality of tying elements applying a compressive force between the second tube and the spacer.

In one embodiment, the end of the second tube has an annular channel defined therein, and a sealing member is disposed in the annular channel defined in the end of the second tube so that a portion of the sealing member is in the annular channel and a portion of the sealing member is in contact with the second side of the spacer. In one embodiment, the sealing member disposed in the annular channel defined in the end of the second tube is an O-ring.

In one embodiment, a plurality of projections is provided proximate to respective ends of the first and second tubes, with the plurality of projections being spaced around respective outer surfaces of the first and second tubes. In one embodiment, the plurality of projections includes posts that extend from respective outer surfaces of the first and second tubes for a distance sufficient to clear an outer periphery of each of the spacer and the second tube, and the plurality of tying elements is respectively coupled to outer ends of the posts of the first tube and outer ends of the posts of the second tube.

In one embodiment, the plurality of projections includes tabs that extend from respective outer surfaces of the first and second tubes for a distance sufficient to clear an outer periphery of each of the spacer and the second tube, each of the tabs has a hole defined therein proximate to an outer end thereof, and the plurality of tying elements is respectively coupled to the plurality of holes in the tabs of the first tube and the plurality of holes in the tabs of the second tube.

In one embodiment, a flange extends from the outer surface of the spacer, with the flange of the spacer having a plurality of holes defined therein. The end of the second tube includes a flange having a plurality of holes defined therein, and the plurality of tying elements is respectively coupled to the plurality of holes in the flange of the spacer and the plurality of holes in the flange of the second tube. In one embodiment, the flange of the second tube is integrally formed with the second tube. In one embodiment, the flange of the second tube is defined by a separate element mounted on the second tube. In one embodiment, the separate element mounted on the second tube is a washer.

In one embodiment, the plurality of tying elements includes springs. In one embodiment, the plurality of tying elements includes springs, or wires, or bolts, or a combination of springs, and/or wires, and/or bolts.

Other aspects and advantages of the disclosures herein will become apparent from the following detailed description, taken in conjunction with the accompanying drawings, which illustrate by way of example the principles of the disclosures.

DETAILED DESCRIPTION

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

Embodiments of the present invention provide a sealing interface that can be used to connect tubes. By way of example, the sealing interface can be used to connect one tube to another tube. The sealing interface also can be used to connect a tube to another component of a system, e.g., a component connected to a manifold for distributing fluids in the system. The sealing interface accommodates radial and angular offset of tubes, particularly tubes for which the pressure inside the tube is lower than the external pressure. The sealing interface can be used at one end of a tube or at both ends of the tube. Further, if necessary to accommodate larger offsets, the sealing interface can be implemented multiple times in a series of tubes.

Figure 1A:
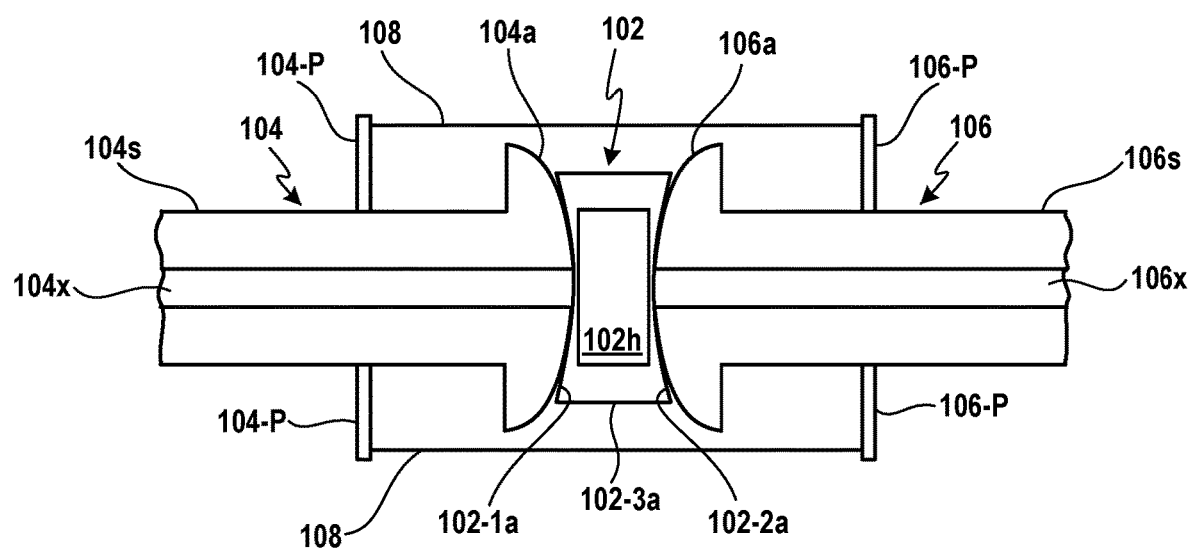
FIG. 1A is a simplified schematic diagram showing tubes connected by a sealing interface, in accordance with one embodiment.

FIG. 1A is a simplified schematic diagram showing tubes connected by a sealing interface, in accordance with one embodiment. As shown in FIG. 1A, spacer 102 is disposed between opposing ends of tubes 104 and 106. The end of tube 104 has a convex surface 104a and the end of tube 106 has a convex surface 106a. Spacer 102 includes a first side 102-1, a second side 102-2, and a third side 102-3 that extends from the first side to the second side. The third side 102-3 has an outer surface 102-3a that defines an outer periphery of spacer 102. The first side 102-1 of spacer 102 has a concave surface 102-1a that substantially matches the convex surface 104a of tube 104. The second side 102-2 of spacer 102 has a convex surface 102-2a that substantially matches the convex surface 106a of tube 106. The spacer 102 also includes a through hole 102h that extends from the first side 102-1 to the second side 102-2. A plurality of projections 104-P is spaced around the outer surface 104s of tube 104 and a plurality of projections 106-P is spaced around the outer surface 106s of tube 106. A plurality of tying elements 108 is used to connect tube 104 and tube 106. In particular, each of the tying elements 108 is respectively coupled to one of the projections 104-P of tube 104 and one of the projections 106-P of tube 106. The tying elements apply a compressive force between tube 104 and spacer 102 and apply a compressive force between tube 106 and spacer 102. The compressive forces applied between the respective tubes 104 and 106 and the spacer 102 keep the spacer positioned between the tubes.

The presence of the spacer 102 between tubes 104 and 106 enables the respective ends of the tubes to be connected in a relatively quickly and efficiently because the spacer allows the relative positioning of the tubes to be adjusted to accommodate radial and angular offset of the tubes. In particular, convex surface 104a of tube 104 and concave surface 102-1a of spacer 102 can be moved relative to one another because the shape of concave surface 102-1a substantially matches the shape of convex surface 104a. Similarly, convex surface 106a of tube 106 and concave surface 102-2a of spacer 102 can be moved relative to one another because the shape of concave surface 102-2a substantially matches the shape of convex surface 106a. The through hole 102h of spacer 102 enables the fluid passageway 104x of tube 104 to remain in fluid communication with the fluid passageway 106x of tube 106 when the relative positions of the tubes are adjusted to accommodate radial and angular offset of the tubes.

Figure 1B:
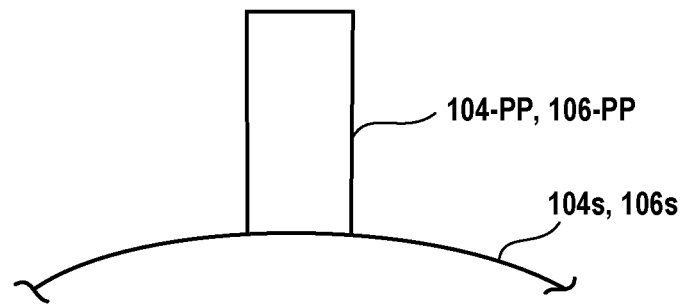
FIGS. 1B, 1C, and 1D are simplified schematic diagrams showing examples of projections that are posts, rods, and tabs, respectively.
Figure 1C:
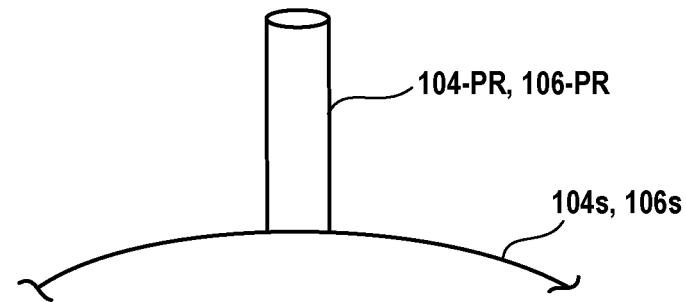
Figure 1D:
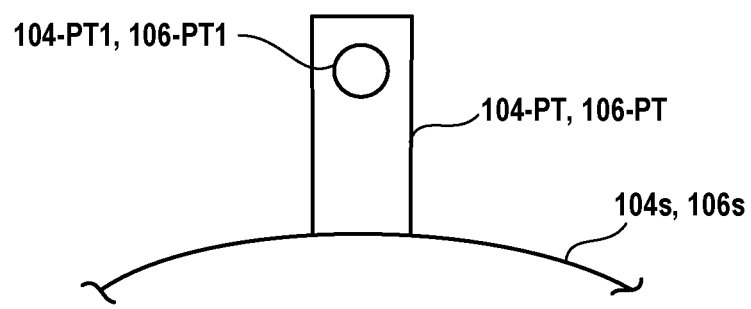

The plurality of projections 104-P spaced around tube 104 and the plurality of projections 106-P spaced around tube 106 can have any suitable configuration. By way of example, projections 104-P and 106-P can be posts, rods, or tabs, as shown in FIGS. 1B, 1C, and 1D, respectively. As shown in FIG. 1B, post 104-PP, 106-PP is disposed on outer surface 104s, 106s. As shown in FIG. 1C, rod 104-PR, 106PR is disposed on outer surface 104s, 106s. As shown in FIG. 1D, tab 104-PT, 106-PT, which has a hole 104-PT1, 106-PT1 defined therein, is disposed on outer surface 104s, 106s. The projections 104-P and 106-P can be integrally formed with the respective tubes 104 and 106, or individually attached to the surfaces of the respective tubes using a suitable joining technique, e.g., welding. In one example embodiment, four projections 104-P are substantially evenly spaced around tube 104 and four projections 106-P are substantially evenly spaced around tube 106. Those skilled in the art will recognize that the number of projections may be varied to meet the needs of particular applications. The tying elements 108 respectively coupled to projections 104-P of tube 104 and projections 106-P of tube 106 can be selected from the family of tying elements suitable for a mechanical application. By way of example, the plurality of tying elements 108 can include springs, or wires, or bolts, or any combination of these elements. In the example in which the tying elements 108 are springs, the springs can be coupled to projections 104-P and 106-P by inserting the hooks at the ends of the springs into holes defined in the outer ends of the projections. In the example in which the tying elements 108 are bolts, the bolts can be coupled to projections 104-P and 106-P by inserting the bolts through holes defined in the outer ends of the projections and fastening suitable nuts to the ends of the bolts. If needed, suitable washers, e.g., spherical washers, can be disposed between the nuts and projections. In the example in which the tying elements 108 are wires, the wires can be attached to the projections 104-P and 106-P in any suitable manner including, by way of example, tying the wires to the ends of the projections, wrapping the wires around the ends of the projections, and running the wires through the holes defined in the ends of the projections and tightening the wires with a suitable mechanism, e.g., a turnbuckle.

Figure 2A:
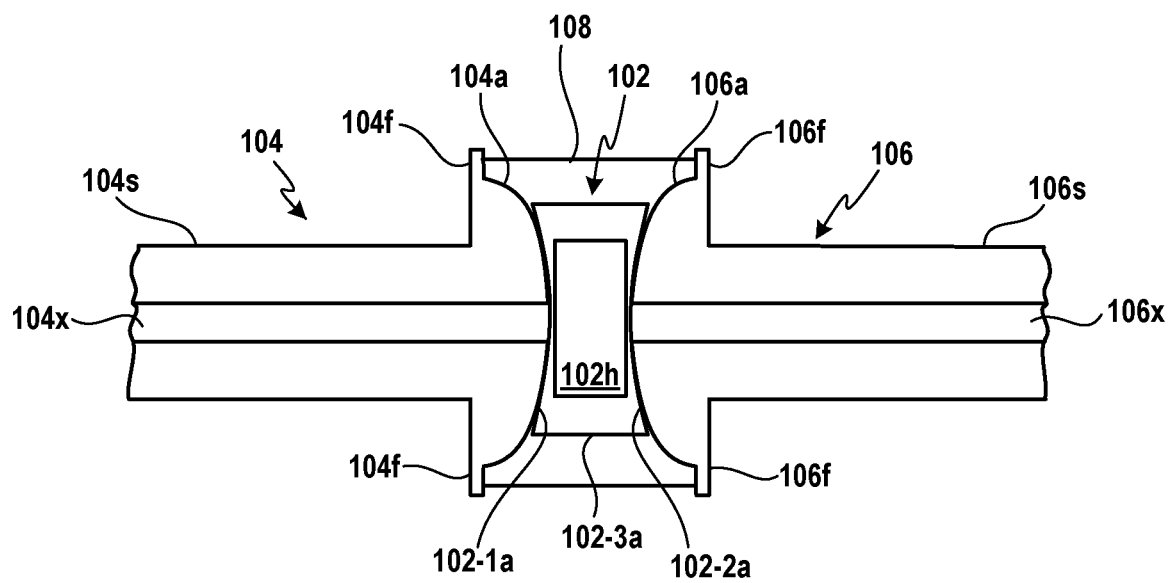
FIG. 2A is a simplified schematic diagram showing tubes connected by a sealing interface, in accordance with another embodiment.

FIG. 2A is a simplified schematic diagram showing tubes connected by a sealing interface, in accordance with another embodiment. The example embodiment of FIG. 2A is similar to the example embodiment of FIG. 1A, but differs in that the tying elements are respectively coupled to flanges at the ends of the respective tubes. In particular, the end of tube 104 includes flange 104f which extends from the outer periphery of convex surface 104a. The end of tube 106 includes flange 106f which extends from the outer periphery of convex surface 106a. In the example in which the tying elements 108 are springs, the springs can be coupled to flange 104f and flange 106f by inserting the hooks at the ends of the springs into a plurality of holes defined in each of the flanges. In the example in which the tying elements 108 are bolts, the bolts can be coupled to flange 104f and flange 106f by inserting the bolts through the holes defined in the flanges and fastening suitable nuts to the ends of the bolts. In the example in which the tying elements 108 are wires, the wires can be attached to the flange 104f and flange 106f in any suitable manner including, by way of example, tying the wires to the holes in the flanges, wrapping the wires around the holes in the flanges, and running the wires through the holes defined in the flanges and tightening the wires with a suitable mechanism, e.g., a turnbuckle. In the example embodiment shown in FIG. 2, the flange 104f is integrally formed with the end of tube 104 and flange 106f is integrally formed with the end of tube 106. It will be apparent to those skilled in the art that the flanges also can be defined by separate elements, e.g., a washer or other ring-like component, mounted on the tubes, as described in more detail below with reference to FIG. 2B.

Figure 2B:
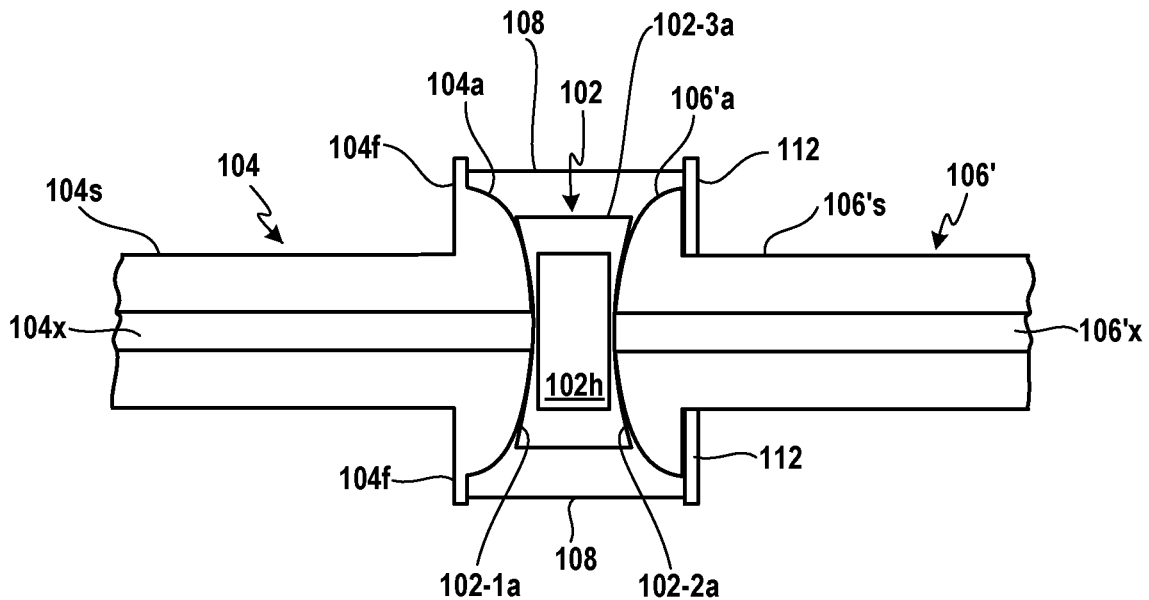
FIG. 2B is a simplified schematic diagram showing tubes connected by a sealing interface, in accordance with another example embodiment.

FIG. 2B is a simplified schematic diagram showing tubes connected by a sealing interface, in accordance with another example embodiment. The example embodiment of FIG. 2B is similar to the example embodiment of FIG. 2A, but differs in that one of the tubes includes a separate flange element. In particular, as shown in FIG. 2B, tube 106' has flange element 112 mounted thereon. In one example embodiment, flange 112 is a washer having a central hole that defines an inner diameter sufficient to enable the washer to be mounted on the tube 106'. The flange element 112 has an outer diameter that is greater than the outer diameter of the end of the tube 106', as defined at the outer periphery of convex surface 106'a. As such, the outer periphery of the flange element 112 can be coupled to tying elements 108 using the same techniques described above for flange 106f (see FIG. 2A). In one example embodiment, a plurality of holes is defined in the outer periphery of flange element 112 and these holes are spaced around the outer periphery of the flange element at desired intervals.

Figure 3:
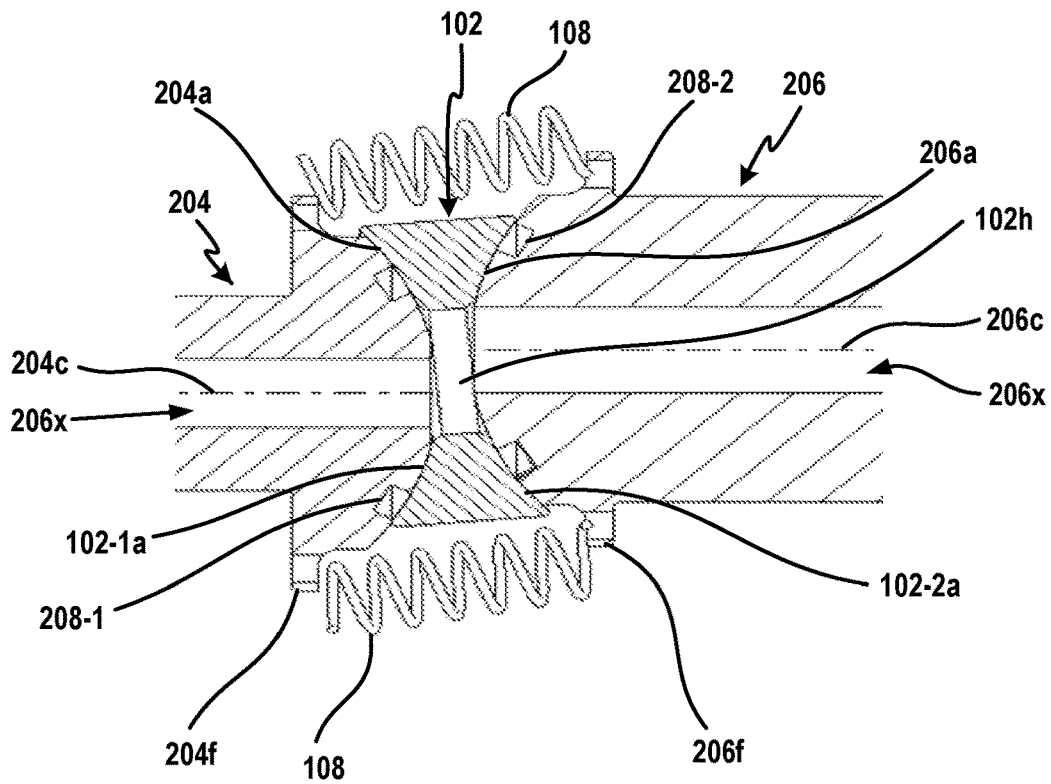
FIG. 3 is a simplified schematic cross-sectional diagram that shows a connected component and a tube connected by a sealing interface, in accordance with an example embodiment.

FIG. 3 is a simplified schematic cross-sectional diagram that shows a connected component and a tube connected by a sealing interface, in accordance with an example embodiment. The first end of connected component 204 is configured to be connected to fluid source so that fluid from the fluid source is guided away from the source through internal passageway 204x of the connected component. In one example embodiment, the fluid source is a manifold, e.g., a manifold for distributing fluid in a semiconductor processing tool. Additional details regarding the connected component are described below with reference to FIGS. 8A-8D.

As shown in FIG. 3, spacer 102 is disposed between the second end of connected component 204 and one end of tube 206. The second end of connected component 204 has a convex surface 204a and the end of tube 206 has a convex surface 206a. The first side 102-1 of spacer 102 has a concave surface 102-1a that substantially matches the convex surface 204a of connected component 204. The second side 102-2 of spacer 102 has a convex surface 102-2a that substantially matches the convex surface 206a of tube 206. The second end of connected component 204 includes flange 204f which extends from the outer surface of the second end of the connected component proximate to the outer periphery of convex surface 204a. The end of tube 206 includes flange 206f which extends from the outer surface of the end of the tube proximate to the outer periphery of convex surface 206a. In the example embodiment of FIG. 3, tying elements 108 are springs. The springs can be coupled to flanges 204f and 206f by inserting the hooks at the ends of the springs into holes 204f-1 defined in flange 204f and holes 206f-1 defined in flange 206f. The tying elements 108 (springs in this example) apply a compressive force between connected component 204 and spacer 102 and apply a compressive force between tube 206 and spacer 102. These compressive forces keep the spacer 102 positioned between the connected component 204 and the tube 206.

In the example embodiment of FIG. 3, sealing member 208-1 is provided between connected component 204 and spacer 102 and sealing member 208-2 is provided between tube 206 and spacer 102. In particular, an annular channel is defined in the convex surface 204a at the second end of connected component 204 and sealing member 208-1 is disposed in the annular channel. Sealing member 208-1 can be disposed in the annular channel so that a portion of the sealing member is in the annular channel and a portion of the sealing member is in contact with concave surface 102-1a of the spacer 102. Similarly, an annular channel is defined in the convex surface 206a at the end of tube 206 and sealing member 208-2 is disposed in the annular channel. Sealing member 208-2 can be disposed in the annular channel so that a portion of the sealing member is in the annular channel and a portion of the sealing member is in contact with concave surface 102-2a of the spacer 102. The compressive forces applied by the tying elements 108 (springs in this example) maintain the integrity of the respective seals provided by sealing members 208-1 and 208-2. By way of example, sealing members 208-1 and 208-2 can be O-rings; however, those skilled in the art will appreciate that any suitable sealing member can be used. Additional details regarding the annular channels defined in the convex surfaces of the connected component and the tube are described below with reference to, for example, FIGS. 7A and 8A.

As shown in FIG. 3, the centerline 204c of connected component 204 is radially offset from the centerline 206c of tube 206. The configuration of the spacer 102, which includes sides having a profile that substantially matches the respective profiles of the ends of the connected component 204 and the tube 206, enables the position of the spacer relative to the connected component and the tube to be adjusted to accommodate the radial offset between the connected component and the tube. As such, the connected component and the tube can be connected relatively quickly despite being radially offset. Further, the through hole 102h of the spacer 102 is in fluid communication with the fluid passageway 204x of the connected component and the fluid passageway 206x of the tube. Thus, notwithstanding the radial offset between the connected component 204 and the tube 206, the fluid passageways 204x and 206x are in fluid communication when the connected component and the tube are connected by the spacer 102.

Figure 4:
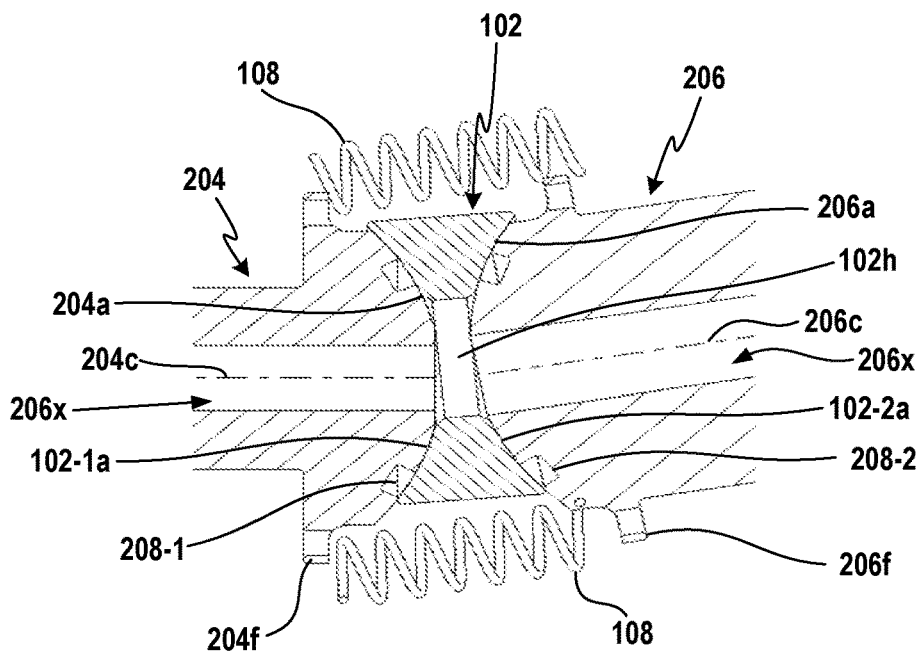
FIG. 4 is a simplified schematic cross-sectional diagram that shows a connected component and a tube connected by a sealing interface, in accordance with another example embodiment.

FIG. 4 is a simplified schematic cross-sectional diagram that shows a connected component and a tube connected by a sealing interface, in accordance with another example embodiment. The example embodiment of FIG. 4 is similar to the example embodiment of FIG. 3, but differs in that there is an angular offset between the connected component 204 and the tube 206. As shown in both FIGS. 3 and 4, the centerline 204c of connected component 204 defines a substantially horizontal line. In FIG. 3, the centerline 206c of tube 206 also defines a substantially horizontal line; however, this horizontal line is radially offset from the horizontal line defined by the centerline 204c of connected component 204. In FIG. 4, the centerline 206c of tube 206 defines a line that is disposed at an angle relative to the horizontal line defined by the centerline 204c of connected component 204. As such, in FIG. 4, there is an angular offset between the connected component 204 and the tube 206.

The configuration of the spacer 102 enables the position of the spacer relative to the connected component 204 and the tube 206 to be adjusted to accommodate the angular offset between the connected component and the tube. As such, the connected component 204 and the tube 206 can be connected relatively quickly despite the angular offset between the connected component and the tube. Further, the through hole 102h of the spacer 102 is in fluid communication with the fluid passageway 204x of the connected component and the fluid passageway 206x of the tube. Thus, notwithstanding the angular offset between the connected component 204 and the tube 206, the fluid passageways 204x and 206x are in fluid communication when the connected component and the tube are connected by the spacer 102.

Figure 5:
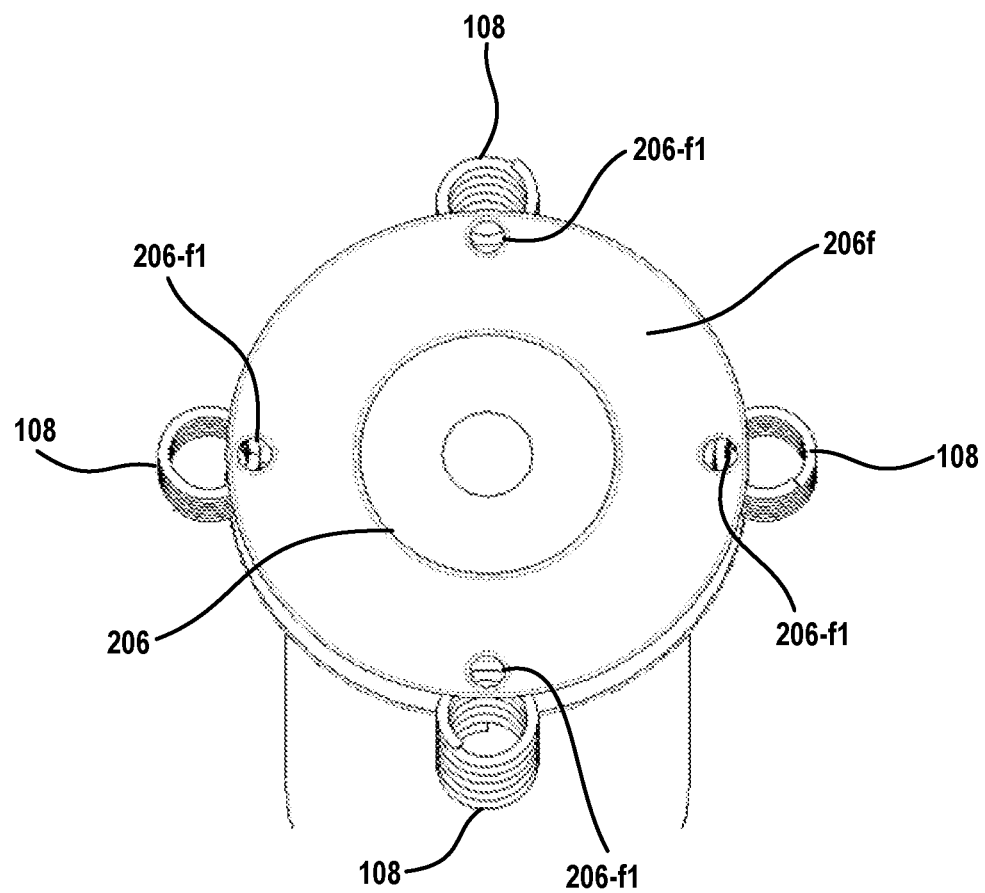
FIG. 5 is an isometric view of the sealing interface that illustrates the positioning of the tying elements, in accordance with an example embodiment.

FIG. 5 is an isometric view of the sealing interface that illustrates the positioning of the tying elements, in accordance with an example embodiment. As shown in FIG. 5, a plurality of holes 206f-1 is defined in the outer periphery of flange 206f of tube 206. A plurality of tying elements 108, which are springs in this example embodiment, are coupled to the holes 206f-1 by inserting the hooks at the one end of the springs into the holes. Although not visible in FIG. 5, the hooks at the other end of the springs are respectively coupled to holes defined in, for example, the outer periphery of flange 204f of connected component 204. In the example embodiment of FIG. 5, four holes 206f-1 are defined in the outer periphery of flange 206f and these four holes are spaced around the flange. In one example, the four holes 206f-1 are substantially evenly spaced around the flange 206f at intervals of about 90 degrees. As used herein, the terms "about" and "approximately" mean that the specified parameter can be varied within a reasonable tolerance, e.g., ±20%. Those skilled in the art will appreciate that the number of holes as well as the spacing of the holes around the flange can be varied to meet the needs of particular applications.

Figure 6:
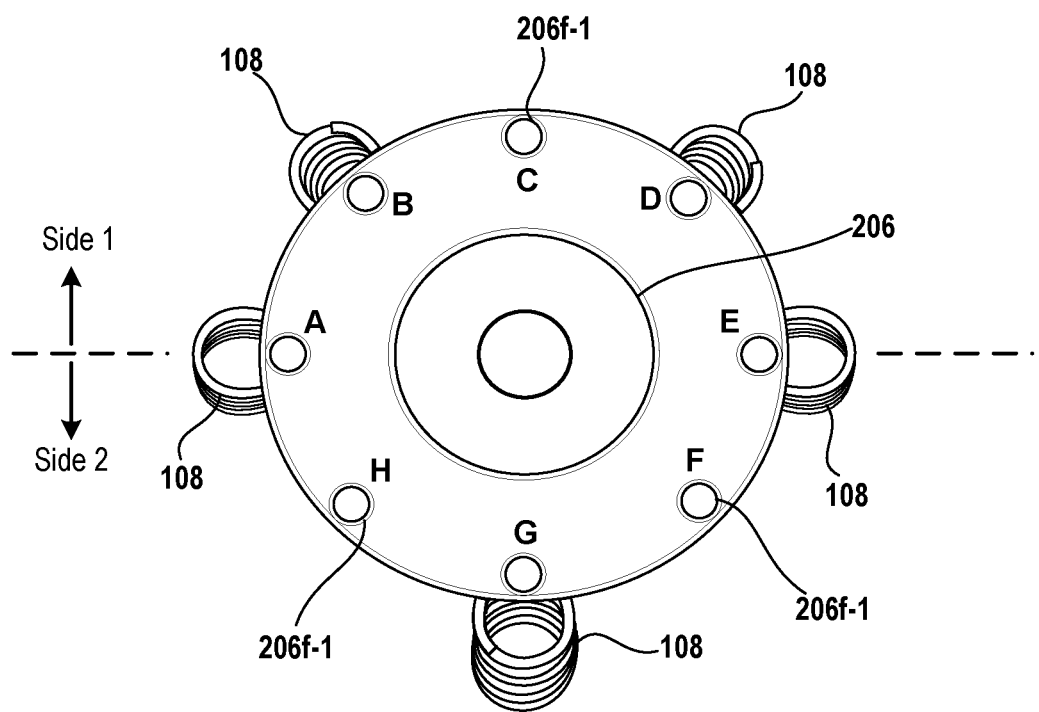
FIG. 6 is an isometric view of the sealing interface that illustrates the use of more tying elements on one side of the flange, in accordance with an example embodiment.

In some applications, it may be beneficial to have more tying elements 108 on one side of the flange 206f, so that more compressive forces can be applied to the spacer on that side of the sealing interface. FIG. 6 is an isometric view of the sealing interface that illustrates the use of more tying elements on one side of the flange, in accordance with an example embodiment. As shown in FIG. 6, eight holes 206f-1 are defined in the outer periphery of flange 206f of tube 206 and these eight holes are spaced around the flange. In one example, the eight holes 206f-1 are substantially evenly spaced around the flange 206f at intervals of about 45 degrees. The positions of the eight holes 206f-1 are labeled A-H in FIG. 6. In this example embodiment, five tying elements 108, which are springs in this example embodiment, are coupled to some of the holes 206f-1 defined in the flange 206. The two springs coupled to the holes 206f-1 located at positions A and E define a line that separates the flange 206 into two sides: side 1 and side 2. The two springs coupled to the holes 206f-1 located at positions B and D are on side 1 of flange 206, and the spring coupled to the hole 206f-1 located at position G is on side 2 of the flange. Although not visible in FIG. 6, those skilled in the art will understand that the hooks at the other end of the five springs are respectively coupled to holes defined in, for example, the outer periphery of flange 204f of connected component 204 (see, for example, FIGS. 3 and 4). Assuming that the springs are standard springs having substantially the same spring rate, the compressive forces applied to the spacer will be greater on side 1 of the flange, which has two springs, than on side 2 of the flange, which has just one spring. It will be apparent to those skilled in the art that the number and spacing of the holes as well as the relative positioning of the springs can be varied from that shown in FIG. 6 to meet the needs of particular applications. Further, those skilled in the art will appreciate that the relative amount of compressive forces applied against the spacer on the sides of the sealing interface can be varied by using custom springs having different spring rates. The use of such custom springs would enable the compressive forces applied to the spacer to be greater on one side of the flange than the other side, while using the same number of springs on each side of the flange.

Figure 7A:
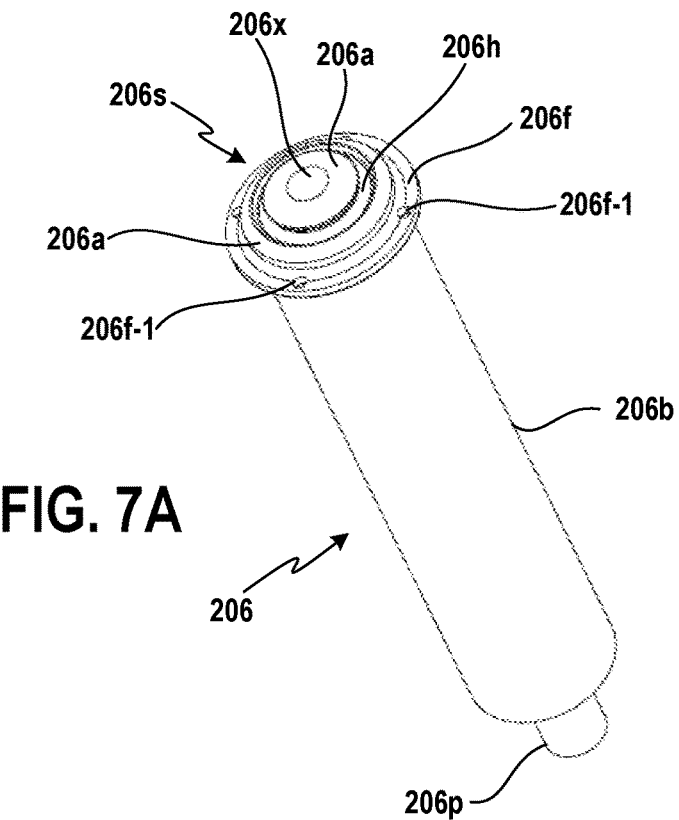
FIG. 7A is an isometric view that illustrates additional details of the tube shown in FIGS. 3-5, in accordance with one embodiment.

FIG. 7A is an isometric view that illustrates additional details of the tube shown in FIGS. 3-5, in accordance with one embodiment. As shown in FIG. 7A, tube 206 includes tubular body portion 206b, a first end 206s, and a second end 206p. The fluid passageway 206x of tube 206 extends from first end 206s to second end 206p. The first end 206s of tube 206 is configured to interface with a spacer (see, e.g., spacer 102 in FIGS. 3 and 4). In particular, first end 206s includes convex surface 206a, which has an annular channel 206h defined therein. The annular channel 206h is configured to receive a portion of a sealing member as described above with reference FIG. 3. A flange 206f extends from the outer surface of tube body portion 206b proximate to the outer periphery of convex surface 206a. As such, the outer periphery of flange 206f defines a major dimension (e.g., a diameter) that is larger than a major dimension defined by the outer surface of tube body portion 206b. A plurality of holes 206f-1 is defined in flange 206f and the holes are spaced around the flange at desired intervals. As described above, the plurality of holes 206f-1 is used to couple tying elements to flange 206 of tube 206. The second end 206p of tube 206 is configured to enable the tube to be connected to another component, e.g., another tube. As such, the second end 206p can be configured to implement any suitable mechanical fastening technique, e.g., threaded fastening, snap fitting, compression fitting, etc.

Figure 7B:
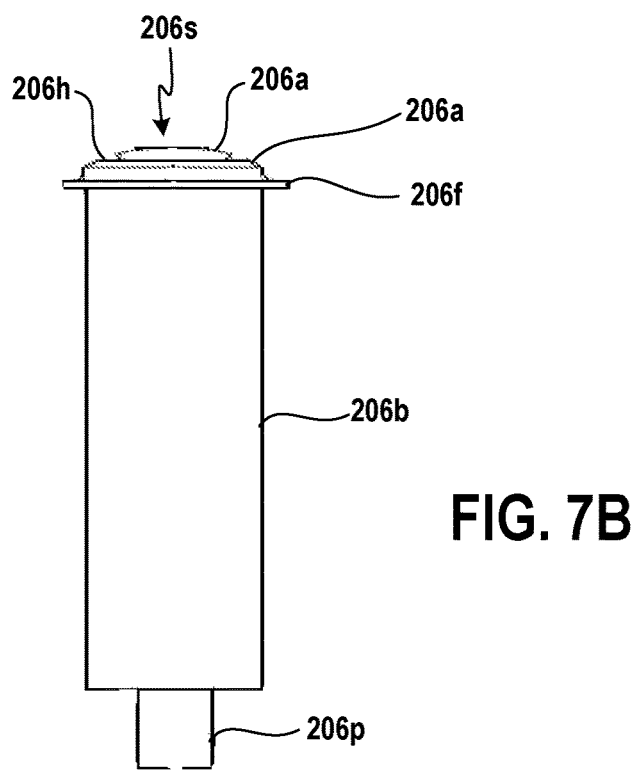
FIG. 7B is a side view of the tube shown in FIG. 7A, in accordance with one embodiment.
Figure 7C:
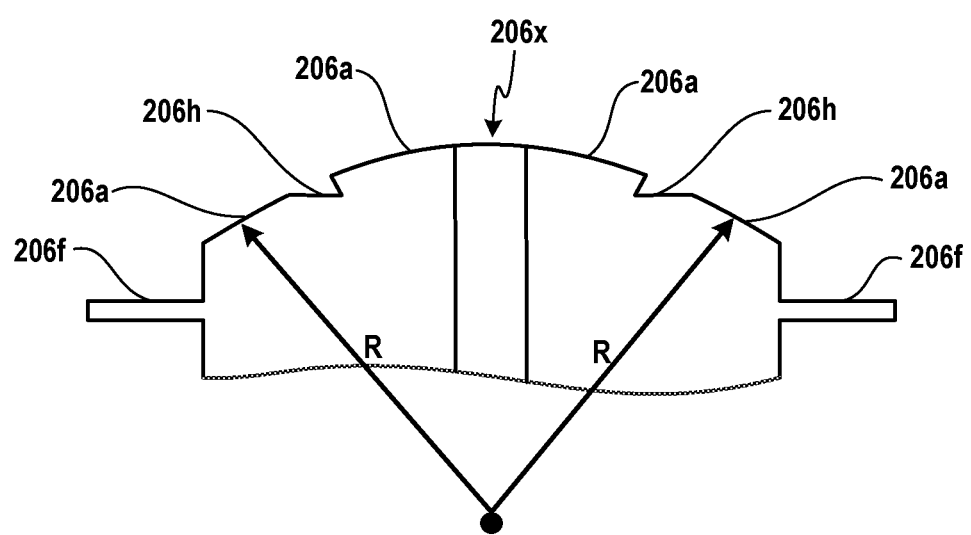
FIG. 7C shows an enlarged cross-sectional view of the first end of the tube shown in FIG. 7B, in accordance with an example embodiment.

FIG. 7B is a side view of the tube 206 shown in FIG. 7A, in accordance with one embodiment. As shown in FIG. 7B, the annular channel 206h defined in convex surface 206a divides the convex surface into two sections. FIG. 7C shows an enlarged cross-sectional view of the first end 206s of the tube 206 shown in FIG. 7B, in accordance with an example embodiment. In the example embodiment of FIG. 7C, the convex surface 206a defines a portion of a sphere having a radius, R. By way of example, radius, R, can be in the range of about 1 inch to about 3 inches. Those skilled in the art will appreciate that the radius, R, can be varied to meet the needs of particular applications. In this example embodiment in which the convex surface 206a has a spherical configuration, the concave surface of the complementary side of the spacer has a substantially matching spherical configuration, as described in more detail below with reference to FIGS. 9A-9C. Those skilled in the art will appreciate that the configuration of convex surface 206a of the first end 206s of tube 206 is not restricted to a spherical configuration, but instead can have any suitable configuration that enables the relative positions of the end of the tube and the complementary side of the spacer to be adjusted. For example, the first end of the tube can be provided with angled surface seals that match the complementary surface of the spacer, or only parts of the first end of the tube can have a spherical configuration.

Figure 8A:
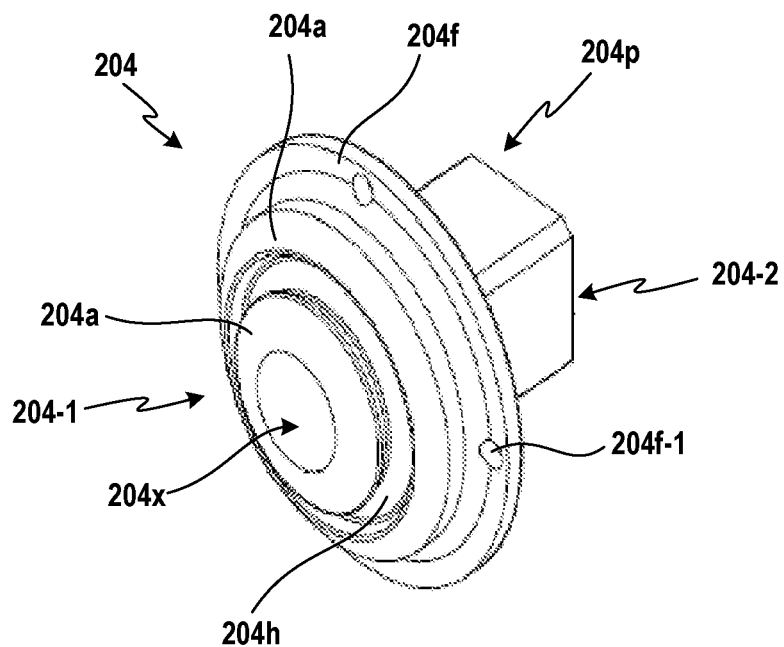
FIGS. 8A and 8B are isometric front and rear views, respectively, that illustrate additional details of a connected component, in accordance with one embodiment.
Figure 8B:
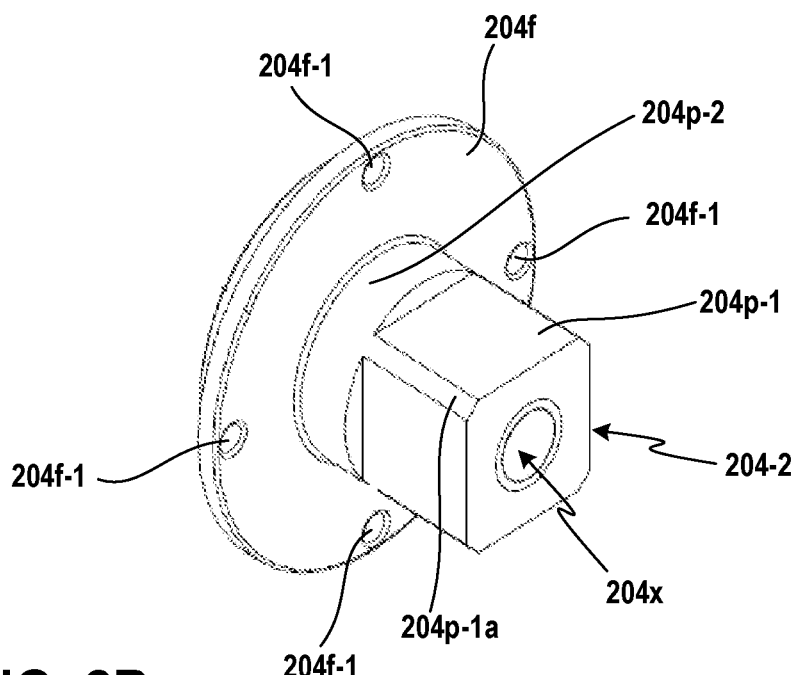

FIGS. 8A and 8B are isometric front and rear views, respectively, that illustrate additional details of a connected component, in accordance with one embodiment. As shown in FIG. 8A, connected component 204 includes first end 204-1, second end 204-2, and internal passageway 204x, which extends from the first end to the second end. The first end 204-1 of connected component 204 is configured to interface with a spacer (see, e.g., spacer 102 in FIGS. 3 and 4). In particular, first end 204-1 includes convex surface 204a, which has an annular channel 204h defined therein. The annular channel 204h is configured to receive a portion of a sealing member as described above with reference FIG. 3. A flange 204f extends from the outer surface of connector portion 204p proximate to the outer periphery of convex surface 204a. As such, the outer periphery of flange 204f defines a major dimension (e.g., a diameter) that is larger than a major dimension defined by the outer surface of connector portion 204p. A plurality of holes 204f-1 is defined in flange 204f and the holes are spaced around the flange at desired intervals. As described above, the plurality of holes 204f-1 is used to couple tying elements to flange 204 of connected component 204. The connector portion 204p of connected component 204 extends away from the first end 204-1 of the connected component and terminates at the second end 204-2 of the connected component. The connector portion 204p is configured to enable the connected component to be connected to another component, e.g., a fluid source, as will be described in more detail with reference to FIG. 8B.

As shown in FIG. 8B, flange 204 includes four holes 204f-1 substantially evenly spaced around the flange at intervals of about 90 degrees. As set forth herein, the number of holes as well as the spacing of the holes around the flange can be varied to meet the needs of particular applications. Connector portion 204p extends away from first end 204-1 and terminates at second end 204-2. Connector portion 204p includes segment 204p-1, which has a generally rectangular configuration, and segment 204p-2, which has a cylindrical configuration. Segment 204p-1 has curved edges 204p-1a and the outer surfaces of the curved edges align with the cylindrical outer surface of segment 204p-2. The function of the connector portion 204p is to enable the connected component 204 to be connected to another component, e.g., a KF flange, a test bench, etc. Thus, those skilled in the art will appreciate that the configuration of connector portion 204 can be varied from that shown in FIGS. 8A and 8B to meet the needs of particular applications. For example, the connected component can be threaded onto another component or welded to another component. In one example embodiment, connected component 204 is configured to be connected to a fluid source, e.g., a manifold for fluid distribution in a system. In this example embodiment, a fluid from the fluid source is guided away from the fluid source through the internal passageway of the connected component.

Figure 8C:
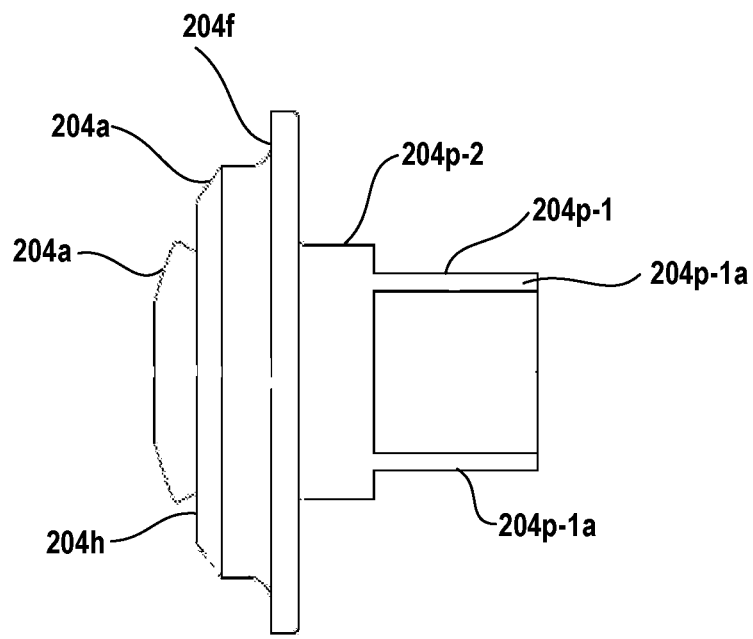
FIG. 8C is a side view of the connected component shown in FIGS. 8A and 8B, in accordance with one embodiment.
Figure 8D:
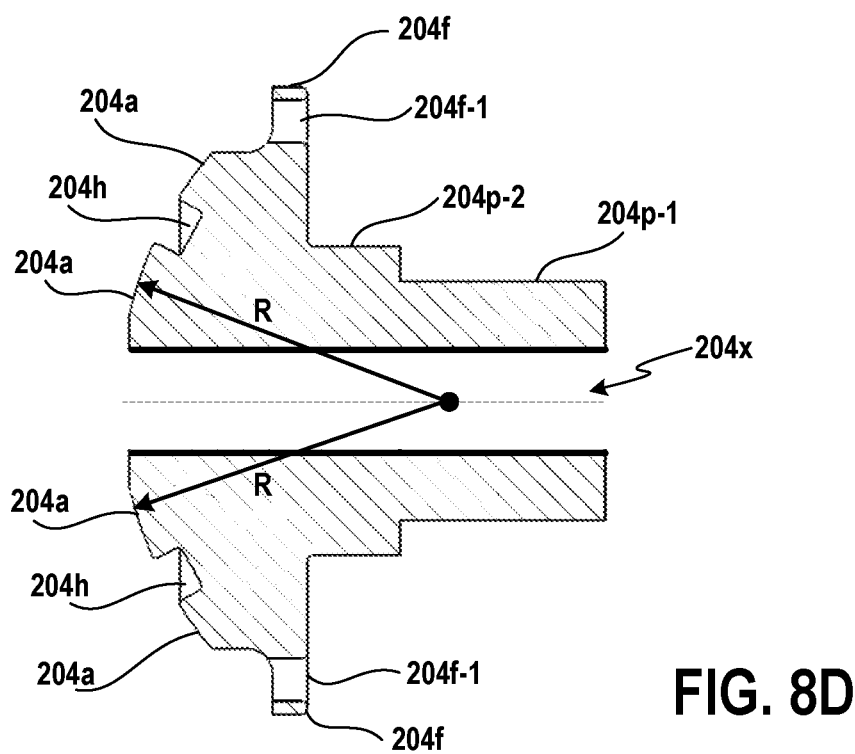
FIG. 8D shows a cross-sectional view of the connected component shown in FIGS. 8A and 8B, in accordance with an example embodiment.

FIG. 8C is a side view of the connected component 204 shown in FIGS. 8A and 8B, in accordance with one embodiment. As shown in FIG. 8C, the annular channel 204h defined in convex surface 204a divides the convex surface into two sections. In addition, the outer surfaces of the curved edges 204p-1 of segment 204p-1 of connector portion 204p extend from the cylindrical outer surface of segment 204p-2. FIG. 8D shows a cross-sectional view of the connected component 204 shown in FIGS. 8A and 8B, in accordance with an example embodiment. In the example embodiment of FIG. 8D, the convex surface 204a defines a portion of a sphere having a radius, R. By way of example, radius, R, can be in the range from about 1 inch to about 3 inches. Those skilled in the art will appreciate that the radius, R, can be varied to meet the needs of particular applications. In this example embodiment in which the convex surface 204a has a spherical configuration, the concave surface of the complementary side of the spacer has a substantially matching spherical configuration, as described in more detail below with reference to FIGS. 9A-9C. Those skilled in the art will appreciate that the configuration of convex surface 204a of the first end 204-1 of connected component 204 is not restricted to a spherical configuration, but instead can have any suitable configuration that enables the relative positions of the end of the connected component and the complementary side of the spacer to be adjusted. By way of example, the first end of the connected component can be provided with angled surface seals that match the complementary surface of the spacer, or only parts of the first end of the connected component can have a spherical configuration.

Figure 9A:
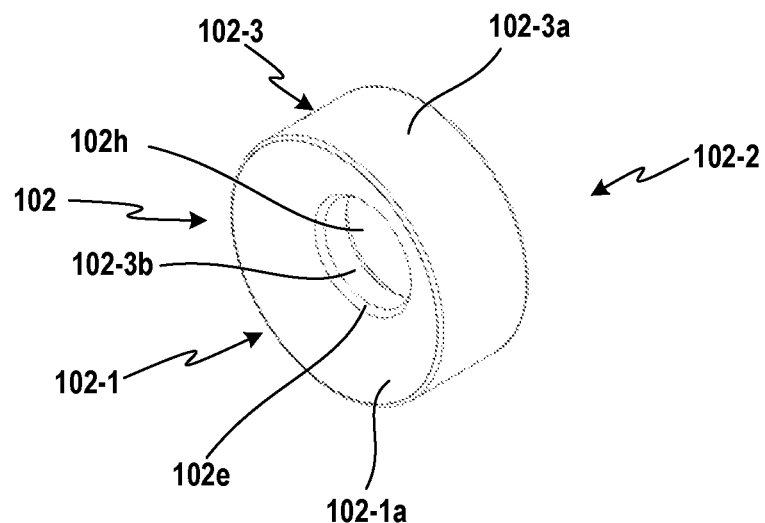
FIG. 9A is an isometric view that illustrates additional details of the spacer shown in FIGS. 3 and 4, in accordance with one embodiment.

FIG. 9A is an isometric view that illustrates additional details of the spacer shown in FIGS. 3 and 4, in accordance with one embodiment. As shown in FIG. 9A, spacer 102 includes a first side 102-1, a second side 102-2 (opposite of first side 102-1 but not visible in FIG. 9A), and a third side 102-3 that extends from the first side to the second side. The third side 102-3 has an outer surface 102-3a that defines an outer periphery of spacer 102. The first side 102-1 of spacer 102 has a concave surface 102-1a that substantially matches the convex surface of one of the components (e.g., a tube and/or a connected component) to be connected using the spacer. The second side 102-2 of spacer 102 has a convex surface 102-2a that substantially matches the convex surface of one of the components to connected using the spacer (see, e.g., FIG. 9C). The spacer 102 also includes a through hole 102h that extends from the first side 102-1 to the second side 102-2. The through hole 102h is defined by inner surface 102-3b of the third side 102-3. An eased corner 102e is provided at the intersection of convex surface 102-1a and inner surface 102-3b as well as at the intersection of convex surface 102-2a (see, e.g., FIG. 9C) and inner surface 102-3b. The eased corner 102e is provided to make it easier for fluid to flow through through hole 102h when the spacer 102 is disposed between, for example, two tubes or a tube and a connected component, and a portion of the spacer extends into the flow path of the fluid. The eased corner 102e can be implemented using, by way of example, a bevel, a chamfer, a rounded or curved edge, etc.

Figure 9B:
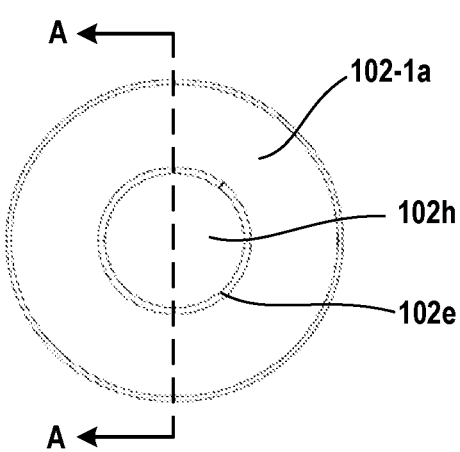
FIG. 9B is a view facing the first side of the spacer shown in FIG. 9A, in accordance with one embodiment.
Figure 9C:
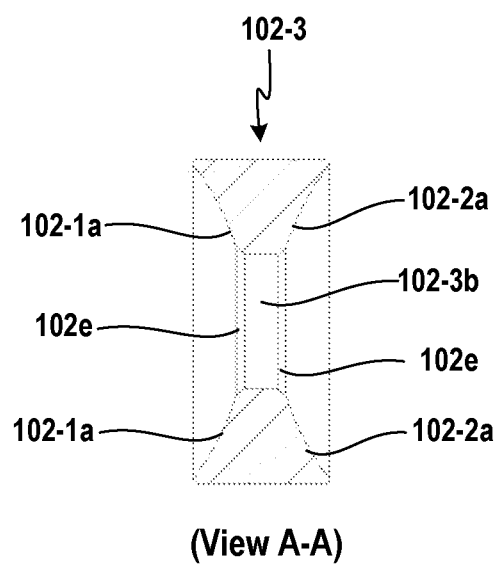
FIG. 9C is a cross-sectional view of the spacer taken along line A-A shown in FIG. 9B, in accordance with one embodiment.

FIG. 9B is a view facing the first side 102-1 of the spacer 102 shown in FIG. 9A, in accordance with one embodiment. FIG. 9C is a cross-sectional view of the spacer taken along line A-A shown in FIG. 9B, in accordance with one embodiment. As shown in FIG. 9C, eased corners 102e are provided at 1) the intersection of concave surface 102-1a and inner surface 102-3b, and 2) the intersection of concave surface 102-2a and inner surface 102-3b. In one example embodiment, both concave surface 102-1a and concave surface 102-2a define a portion of a sphere. By way of example, the radius of the sphere can be in the range of about 1 inch to about 3 inches. Those skilled in the art will appreciate that the radius of the sphere can be varied to meet the needs of particular applications. In this example embodiment in which each of the concave surfaces 102-1a and 102-2a has a spherical configuration, the convex surfaces of the complementary ends of the tubes (or tube and connected component) have substantially matching spherical configurations. Those skilled in the art will appreciate that the configuration of concave surfaces 102-1a and 102-2a of the spacer 102 is not restricted to a spherical configuration, but instead can have any suitable configuration that enables the relative positions of the sides of the spacer and the complementary ends of the tubes (or tube and connected component) to be adjusted. By way of example, the concave surfaces of the spacer can have a conical configuration and/or the spacer can be provided with two angled surface seals that match the complementary surfaces of the ends of the tubes (or tube and connected component).

Figure 10:
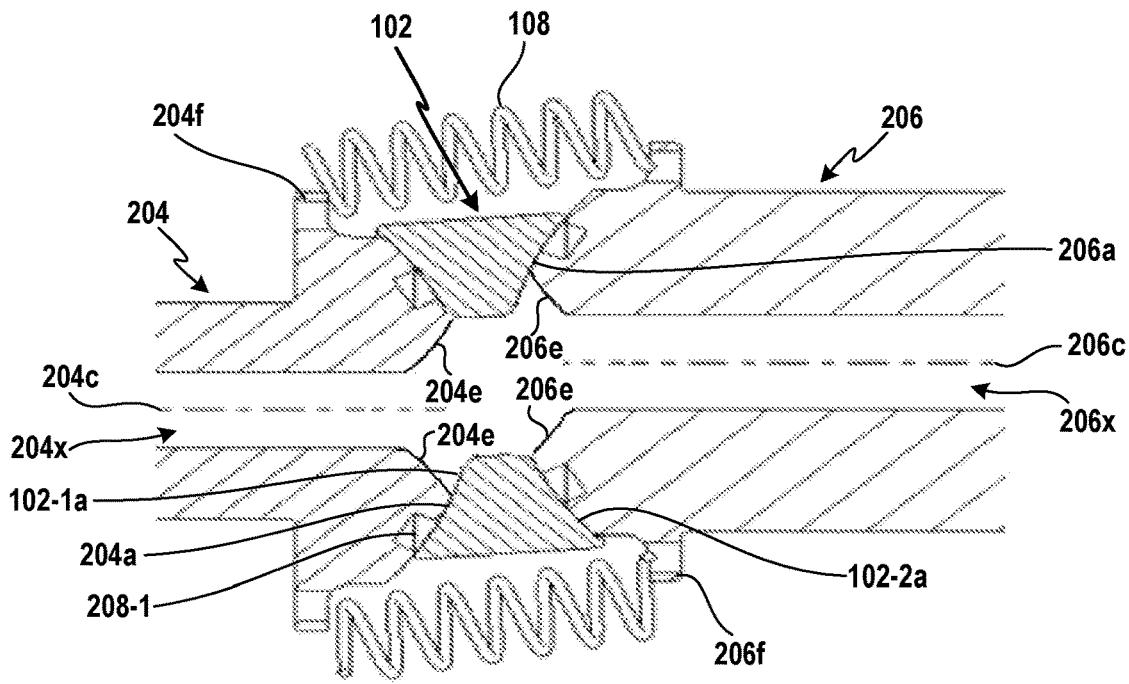
FIG. 10 is a simplified schematic cross-sectional diagram that shows a connected component and a tube connected by a sealing interface, in accordance with another example embodiment.

FIG. 10 is a simplified schematic cross-sectional diagram that shows a connected component and a tube connected by a sealing interface, in accordance with another example embodiment. Similar to the view shown in FIG. 3, in FIG. 10, the connected component 204 is radially offset from the tube 206. Due to this radial offset, a portion of the convex surface 206a of tube 206 protrudes into the flow path of a fluid moving through connected component 204, spacer 102, and tube 206 (see FIG. 3) and thereby serves as an abrupt obstacle that can disrupt the flow of the fluid. To lessen any flow disruption in the case of such radial offset, an eased corner can be provided at one or both of the end of the tube and the end of the connected component. In particular, as shown in FIG. 10, eased corner 204e is provided at the intersection of the fluid passageway 204x and the convex surface 204a of the connected component 204. Eased corner 206e is provided at the intersection of the fluid passageway and the convex surface 206a of the tube 206. The eased corners 204e and 206e can be implemented using, by way of example, a bevel, a chamfer, a rounded or curved edge, etc. In the case of a fluid moving from fluid passageway 204x to fluid passageway 206x (through spacer 102), the presence of eased corner 206e in the flow path may lessen disruption of the fluid flow and thereby improve one or more flow parameters including, by way of example, flow rate, turbulence, etc.

Figure 11:
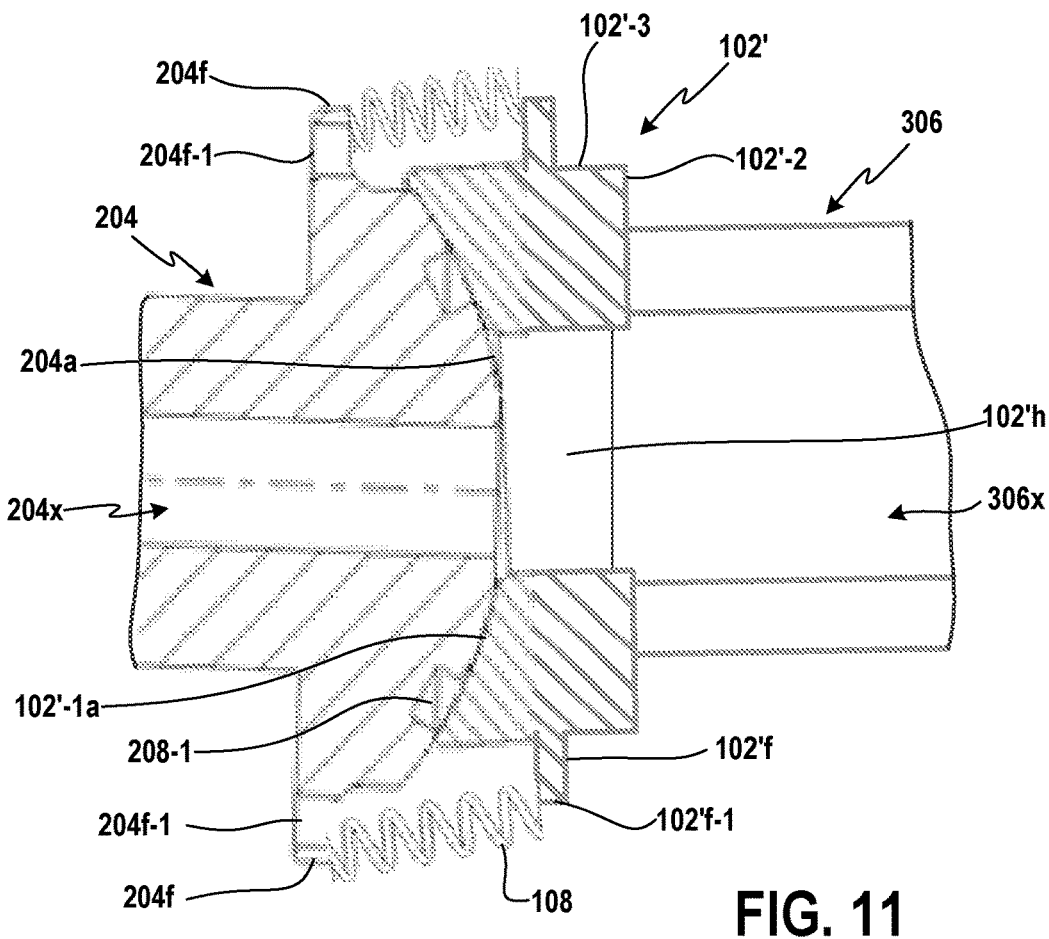
FIG. 11 is a simplified schematic cross-sectional diagram that shows a connected component and a tube connected by a sealing interface in which the spacer is attached to the tube, in accordance with an example embodiment.

In the example embodiments shown in, for example, FIGS. 1, 2A-2B, 3, 4, and a spacer is disposed between two tubes (FIGS. 1, 2A, and 2B) or disposed between a connected component and a tube (FIGS. 3, 4, and 10). In these example embodiments, the spacer is held in place between the tubes (or between the connected component and the tube) by the compressive forces generated by the tying elements. In some applications, it may be desirable to attach one side of the spacer to a tube. In this scenario, only one side of the spacer would have a surface that substantially matches the complementary end of either another tube or a connected component. FIG. 11 is a simplified schematic cross-sectional diagram that shows a connected component and a tube connected by a sealing interface in which the spacer is attached to the tube, in accordance with an example embodiment. As shown in FIG. 11, spacer 102' includes first side 102'-1, second side 102'-2, and third side 102'-3, which extends from the first side to the second side. The spacer 102' also includes a through hole 102'h that extends from the first side 102'-1 to the second side 102'-2. The second side 102'-2 of spacer 102' is attached to an end of the tube 306. The second side 102'-2 of spacer 102' can be attached to the end of the tube 306 using any technique suitable for the materials from which the spacer and the tube are formed. By way of example, the spacer can be attached to the end of the tube using techniques such as welding, gluing (or using another adhesive material), and mechanical fastening (bolts, screws, clips, threads, etc.). Those skilled in the art will appreciate that the spacer also could be integrally formed with the tube, rather than being formed as a separate component that is attached to the tube.

As shown in FIG. 11, a flange 102'f extends from the outer surface of the third side 102'-3 of spacer 102'. In one example embodiment, the flange 102'f extends from the third side 102'-3 of the spacer 102' at a location approximately midway between the first side 102'-1 and the second side 102'-2; however, those skilled in the art will appreciate that the location of the flange on the spacer can be varied. The flange has a plurality of holes 102'T-1 defined in the outer periphery of the flange and these holes are spaced around the flange. The connected component 204 shown in FIG. 11 is the same as that described herein with reference to, for example, FIG. 3. The first side 102'-1 of spacer 102' has a concave surface 102'-1a that substantially matches the convex surface 204a of connected component 204. The end of connected component 204 includes flange 204f which extends from the outer surface of the end of the connected component proximate to the outer periphery of convex surface 204a. In the example embodiment of FIG. 11, tying elements 108 are springs. The springs can be coupled to flanges 204f and 102'f by inserting the hooks at the ends of the springs into holes 204f-1 defined in flange 204f and holes 102T-1 defined in flange 102T. The tying elements 108 (springs in this example) apply a compressive force between connected component 204 and spacer 102', which is attached to tube 306. This compressive force keeps the end of the connected component 204 and the spacer 102' in position in proximity to one another. The substantially matching configurations of convex surface 204a of connected component 204 and concave surface 102'-1a of the spacer 102' enable the position of the connected component relative to the spacer, which is attached to tube 306, to be adjusted to accommodate any radial or angular offset between the connected component and the spacer/tube.

The tubes and the spacer described herein can be formed of any material suitable for the particular application in which the sealing interface is being used. In one example in which the tubes are used to transport remote plasma in a semiconductor processing tool, the tubes and the spacer are formed of either aluminum or a ceramic material. These materials have sufficient properties (e.g., heat resistance, chemical resistance, etc.) to minimize the degree to which the remote plasma eats away at the inner surfaces of the tubes and the spacer. In other examples in which the tubes are used to transport fluids such as air and water, the tubes and the spacer can be formed from a wider range of materials including metallic materials (e.g., stainless steel, aluminum, etc.), ceramic materials, and plastic materials (e.g., polyethylene terephthalate (PET)).

In some implementations, a controller is part of a system, which may be part of the above-described examples. Such systems can comprise semiconductor processing equipment, including a processing tool or tools, chamber or chambers, a platform or platforms for processing, and/or specific processing components (a wafer pedestal, a gas flow system, etc.). These systems may be integrated with electronics for controlling their operation before, during, and after processing of a semiconductor wafer or substrate. The electronics may be referred to as the "controller," which may control various components or subparts of the system or systems. The controller, depending on the processing requirements and/or the type of system, may be programmed to control any of the processes disclosed herein, including the delivery of processing gases, temperature settings (e.g., heating and/or cooling), pressure settings, vacuum settings, power settings, radio frequency (RF) generator settings, RF matching circuit settings, frequency settings, flow rate settings, fluid delivery settings, positional and operation settings, wafer transfers into and out of a tool and other transfer tools and/or load locks connected to or interfaced with a specific system.

Broadly speaking, the controller may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a particular process on or for a semiconductor wafer or to a system. The operational parameters may, in some embodiments, be part of a recipe defined by process engineers to accomplish one or more processing steps during the fabrication of one or more layers, materials, metals, oxides, silicon, silicon dioxide, surfaces, circuits, and/or dies of a wafer.

The controller, in some implementations, may be a part of or coupled to a computer that is integrated with, coupled to the system, otherwise networked to the system, or a combination thereof. For example, the controller may be in the "cloud" or all or a part of a fab host computer system, which can allow for remote access of the wafer processing. The computer may enable remote access to the system to monitor current progress of fabrication operations, examine a history of past fabrication operations, examine trends or performance metrics from a plurality of fabrication operations, to change parameters of current processing, to set processing steps to follow a current processing, or to start a new process. In some examples, a remote computer (e.g. a server) can provide process recipes to a system over a network, which may include a local network or the Internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control. Thus as described above, the controller may be distributed, such as by comprising one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

Without limitation, example systems may include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

Although method operations may be described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Accordingly, the disclosure of the example embodiments is intended to be illustrative, but not limiting, of the scope of the disclosures, which are set forth in the following claims and their equivalents. Although example embodiments of the disclosures have been described in some detail for purposes of clarity of understanding, it will be apparent that certain changes and modifications can be practiced within the scope of the following claims. In the following claims, elements and/or steps do not imply any particular order of operation, unless explicitly stated in the claims or implicitly required by the disclosure.

The invention claimed is:

1. A sealing interface, comprising:
   a first tube having an end with a convex surface;
   a second tube having an end with a convex surface;
   a spacer disposed between the respective ends of the first tube and the second tube, the spacer including a first side, a second side, and a third side that extends from the first side to the second side, the third side having an outer surface that defines an outer periphery of the spacer, the first side of the spacer having a concave surface that substantially matches the convex surface of the end of the first tube, the second side of the spacer having a concave surface that substantially matches the convex surface of the end of the second tube, and the spacer including a through hole that extends from the first side to the second side, the through hole being in fluid communication with a fluid passageway of the first tube and a fluid passageway of the second tube; and
   a plurality of tying elements respectively coupled to the first tube and the second tube, the plurality of tying elements applying a compressive force between the first tube and the spacer, and the plurality of tying elements applying a compressive force between the second tube and the spacer,
   wherein a plurality of projections is provided proximate to respective ends of the first and second tubes, the plurality of projections being spaced around respective outer surfaces of the first and second tubes, and wherein the plurality of projections includes tabs that extend from respective outer surfaces of the first and second tubes for a distance sufficient to clear an outer periphery of each of the respective ends of the first and second tubes, each of the tabs has a hole defined therein proximate to an outer end thereof, and the plurality of tying elements is respectively coupled to the plurality of holes in the tabs of the first tube and the plurality of holes in the tabs of the second tube.

2. The sealing interface of claim 1, wherein the end of the first tube has an annular channel defined therein, and a sealing member is disposed in the annular channel defined in the end of the first tube so that a portion of the sealing member is in the annular channel and a portion of the sealing member is in contact with the first side of the spacer.

3. The sealing interface of claim 2, wherein the sealing member disposed in the annular channel defined in the end of the first tube is an O-ring.

4. The sealing interface of claim 2, wherein the end of the second tube has an annular channel defined therein, and a sealing member is disposed in the annular channel defined in the end of the second tube so that a portion of the sealing member is in the annular channel and a portion of the sealing member is in contact with the second side of the spacer.

5. The sealing interface of claim 4, wherein each of the sealing members disposed in the annular channels defined in the respective ends of the first and second tubes is an O-ring.

6. A sealing interface, comprising:
   a connected component having a first end, a second end, and an internal passageway extending from the first end to the second end, the first end being configured to be connected to a fluid source so that a fluid from the fluid source is guided away from the source through the internal passageway of the connected component, the second end including a convex surface and a flange, the flange having a plurality of holes defined therein;
   a tube having an end with a convex surface and a flange, the flange having a plurality of holes defined therein;
   a spacer disposed between the second end of the connected component and the end of the tube, the spacer including a first side, a second side, and a third side that extends from the first side to the second side, the third side having an outer surface that defines an outer periphery of the spacer, the first side of the spacer having a concave surface that substantially matches the convex surface of the second end of the connected component, the second side of the spacer having a concave surface that substantially matches the convex surface of the end of the tube, and the spacer including a through hole that extends from the first side to the second side, the through hole being in fluid communication with the internal passageway of the connected component and a fluid passageway of the tube; and
   a plurality of tying elements respectively coupled to the plurality of holes in the flange of the connected component and the plurality of holes in the flange of the tube, the plurality of tying elements applying a compressive force between the connected component and the spacer, and the plurality of tying elements applying a compressive force between the tube and the spacer,
   wherein the second end of the connected component has an annular channel defined therein, and a sealing member is disposed in the annular channel defined in the second end of the connected component so that a portion of the sealing member is in the annular channel and a portion of the sealing member is in contact with the first side of the spacer.

7. The sealing interface of claim 6, wherein the sealing member disposed in the annular channel defined in the second end of the connected component is an O-ring.

8. The sealing interface of claim 6, wherein the end of the tube has an annular channel defined therein, and a sealing member is disposed in the annular channel defined in the end of the tube so that a portion of the sealing member is in the annular channel and a portion of the sealing member is in contact with the second side of the spacer.

9. The sealing interface of claim 8, wherein each of the sealing members disposed in the annular channels defined in the respective ends of the connected component and the tube is an O-ring.

10. The sealing interface of claim 6, wherein the plurality of tying elements includes springs.

11. The sealing interface of claim 6, wherein the flange of the connected component has four holes defined therein, the four holes being substantially evenly spaced around an outer periphery of the flange of the connected component, the flange of the tube has four holes defined therein, the four holes being substantially evenly spaced around an outer periphery of the flange of the tube, and four tying elements are respectively coupled to the four holes defined in the flange of the connected component and the four holes in the flange of the tube.

12. The sealing interface of claim 11, wherein the four tying elements are springs.

13. The sealing interface of claim 6, wherein the flange of the connected component has at least five holes defined therein, the at least five holes being spaced around an outer periphery of the flange of the connected component, the flange of the tube has at least five holes defined therein, the at least five holes being spaced around an outer periphery of the flange of the tube, and at least five tying elements are respectively coupled to the at least five holes defined in the flange of the connected component and the at least five holes in the flange of the tube.

14. The sealing interface of claim 13, wherein the at least five tying elements include springs.

15. A sealing interface, comprising:
a first tube having an end;
a spacer having a first side, a second side, and a third side that extends from the first side to the second side, the third side having an outer surface that defines an outer periphery of the spacer, the first side of the spacer being attached to the end of the first tube, the second side of the spacer having a concave surface, and the spacer including a through hole that extends from the first side to the second side, the through hole being in fluid communication with a fluid passageway of the first tube;
a second tube having an end with a convex surface that substantially matches the concave surface of the second side of the spacer, the end of the second tube being disposed in an opposing relationship with the second side of the spacer so that the through hole of the spacer is in fluid communication with a fluid passageway of the second tube; and
a plurality of tying elements respectively coupled to the spacer and the second tube, the plurality of tying elements applying a compressive force between the second tube and the spacer,
wherein a flange extends from the outer surface of the spacer, the flange of the spacer having a plurality of holes defined therein, the end of the second tube includes a flange having a plurality of holes defined therein, and the plurality of tying elements is respectively coupled to the plurality of holes in the flange of the spacer and the plurality of holes in the flange of the second tube.

16. The sealing interface of claim 15, wherein the end of the second tube has an annular channel defined therein, and a sealing member is disposed in the annular channel defined in the end of the second tube so that a portion of the sealing member is in the annular channel and a portion of the sealing member is in contact with the second side of the spacer.

17. The sealing interface of claim 16, wherein the sealing member disposed in the annular channel defined in the end of the second tube is an O-ring.

18. The sealing interface of claim 15, wherein the flange of the second tube is integrally formed with the second tube.

19. The sealing interface of claim 15, wherein the flange of the second tube is defined by a separate element mounted on the second tube.

20. The sealing interface of claim 19, wherein the separate element mounted on the second tube is a washer.

21. The sealing interface of claim 15, wherein the plurality of tying elements includes springs.

\* \* \* \* \*